US007379882B2

(12) United States Patent
Adams et al.

(10) Patent No.: US 7,379,882 B2
(45) Date of Patent: May 27, 2008

(54) ARCHITECTURE DESIGNING METHOD AND SYSTEM FOR E-BUSINESS SOLUTIONS

(75) Inventors: Jonathan William Adams, Macclesfield (GB); George M. Galambos, Montreal (CA); Srinivas Koushik, Goldens Bridge, NY (US); Guruprasad Chitrapur Vasudeva, North Bethesda, MD (US)

(73) Assignee: International Business Machines Corporation, Armonk, NY (US)

( * ) Notice: Subject to any disclaimer, the term of this patent is extended or adjusted under 35 U.S.C. 154(b) by 1387 days.

(21) Appl. No.: 09/925,259

(22) Filed: Aug. 9, 2001

(65) Prior Publication Data
US 2003/0040920 A1 Feb. 27, 2003

(51) Int. Cl.
*G06Q 99/00* (2006.01)
*G05B 19/418* (2006.01)
(52) U.S. Cl. .................. 705/1; 705/10; 705/8; 705/9
(58) Field of Classification Search .................. 705/1, 705/6, 7, 8, 26, 9, 10; 703/1, 6; 706/46, 706/45; 707/6, 3, 223
See application file for complete search history.

(56) References Cited

U.S. PATENT DOCUMENTS

| 5,666,493 | A | | 9/1997 | Wojcik et al. |
| 5,819,267 | A | * | 10/1998 | Uyama .......................... 707/6 |
| 5,870,719 | A | | 2/1999 | Maritzen et al. |
| 5,940,817 | A | * | 8/1999 | Kishi et al. .................... 706/46 |
| 5,968,110 | A | | 10/1999 | Westrope et al. |
| 6,115,690 | A | | 9/2000 | Wong |
| 6,233,537 | B1 | * | 5/2001 | Gryphon et al. ............... 703/1 |
| 6,385,609 | B1 | * | 5/2002 | Barshefsky et al. ........... 707/6 |
| 7,206,751 | B2 | * | 4/2007 | Hack et al. .................... 705/7 |
| 2001/0032092 | A1 | * | 10/2001 | Calver .......................... 705/1 |

OTHER PUBLICATIONS

Stephens, S. "Supply Chain Council & Supply Chain Operations Reference (SCOR) Model Overview", Nov. 1998.*

* cited by examiner

*Primary Examiner*—Tan Dean D. Nguyen
(74) *Attorney, Agent, or Firm*—Cardinal Law Group

(57) ABSTRACT

The invention provides a method for designing an architecture for e-business solutions. A business description of the e-business solution is developed. The business description describes each actor and each business function in the e-business solution. The business description further describes each interaction among one or more actors and one or more business functions. A pictorial representation of the business description is developed. Business pattern(s), integration pattern(s), composite pattern(s), and application pattern(s) that are identifiable within the pictorial representation are established. Each business pattern is indicative of each grouping of one or more actors and one or more business functions based on a nature of the interaction among the one or more actors and the one or more business functions. Each integration pattern is indicative of an integration of two or more business patterns. Each composite pattern is indicative of a grouping of a recurring combination of one or more business patterns and one or more integration patterns. Each application pattern is indicative of a partitioning of an application logic and a data together with the styles of interaction among a plurality of logical tiers.

9 Claims, 15 Drawing Sheets

ARCHITECTURE DESIGNING METHOD AND SYSTEM FOR E-BUSINESS SOLUTIONS

FIELD OF THE INVENTION

In general, the invention relates to e-business solutions. More specifically, the invention relates to the development of e-business solutions and in particular, to a method and a system for the architectural designing of e-business solutions.

BACKGROUND OF THE INVENTION

As known in the art, e-business solutions allow an organization to leverage web and related technologies. As a result, organizations can re-engineer business processes and enhance communications. Additionally, organizations can lower organizational boundaries among their customers and their shareholders across the Internet, among their employees and shareholders across a corporate Intranet, and among their vendors, suppliers, and partners across an corporate Extranet. However, organizations and providers of systems integration services typically lack access to expertise and tools to timely develop and provide the e-business solution.

Thus, there is a significant need for a method and a system for improving the architectural designing of e-business solutions so that the potential benefits of utilizing comprehensive expertise and established tools related to e-business solutions can be realized.

SUMMARY OF THE INVENTION

One aspect of the present invention provide a method for designing architecture for an e-business solution. A business description of the e-business solution is developed. The business description describes each actor and each business function in the e-business solution. The business description further describes each interaction among one or more actors and one or more business functions. A pictorial representation of the business description is developed. Business pattern(s), integration pattern(s), composite pattern(s), and application pattern(s) that are identifiable within the pictorial representation are established. Each business pattern is indicative of each grouping of one or more actors and one or more business functions based on a nature of the interaction among the one or more actors and the one or more business functions. Each integration pattern is indicative of an integration of two or more business patterns. Each composite pattern is indicative of a grouping of a recurring combination of one or more business patterns and one or more integration patterns. Each application pattern is indicative of a partitioning of an application logic and a data together with the styles of interaction among a plurality of logical tiers.

Another aspect of the invention provides a system for designing an architecture for an e-business solution. The system comprises means for developing a business description of the e-business solution. The business description describes each actor and each business function in the e-business solution. The business description further describes each interaction among one or more actors and one or more business functions. The system further comprises means for developing a pictorial representation of the business description, means for establishing one or more business patterns that are identifiable within the pictorial representation, means for establishing one or more integration patterns that are identifiable within the pictorial representation, means for establishing one or more composite patterns that are identifiable within the pictorial representation, and means for establishing one or more application patterns that are identifiable within the pictorial representation. Each business pattern is indicative of each grouping of one or more actors and one or more business functions based on a nature of the interaction among the one or more actors and the one or more business functions. Each integration pattern is indicative of an integration of two or more business patterns. Each composite pattern is indicative of a grouping of a recurring combination of one or more business patterns and one or more integration patterns. Each application pattern is indicative of a partitioning of an application logic and a data together with the styles of interaction among a plurality of logical tiers.

Another aspect of the invention provides a computer program product in a computer readable medium for designing an architecture for an e-business solution. The computer program product comprises computer readable code for developing a business description of the e-business solution. The business description describes each actor and each business function in the e-business solution. The business description further describes each interaction among one or more actors and one or more business functions. The computer program product further comprises computer readable code for developing a pictorial representation of the business description, computer readable code for establishing one or more business patterns that are identifiable within the pictorial representation, computer readable code for establishing one or more integration patterns that are identifiable within the pictorial representation, computer readable code for establishing one or more composite patterns that are identifiable within the pictorial representation, and computer readable code for establishing one or more application patterns that are identifiable within the pictorial representation. Each business pattern is indicative of each grouping of one or more actors and one or more business functions based on a nature of the interaction among the one or more actors and the one or more business functions. Each integration pattern is indicative of an integration of two or more business patterns. Each composite pattern is indicative of a grouping of a recurring combination of one or more business patterns and one or more integration patterns. Each application pattern is indicative of a partitioning of an application logic and a data together with the styles of interaction among a plurality of logical tiers.

The foregoing forms and other features and advantages of the present invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
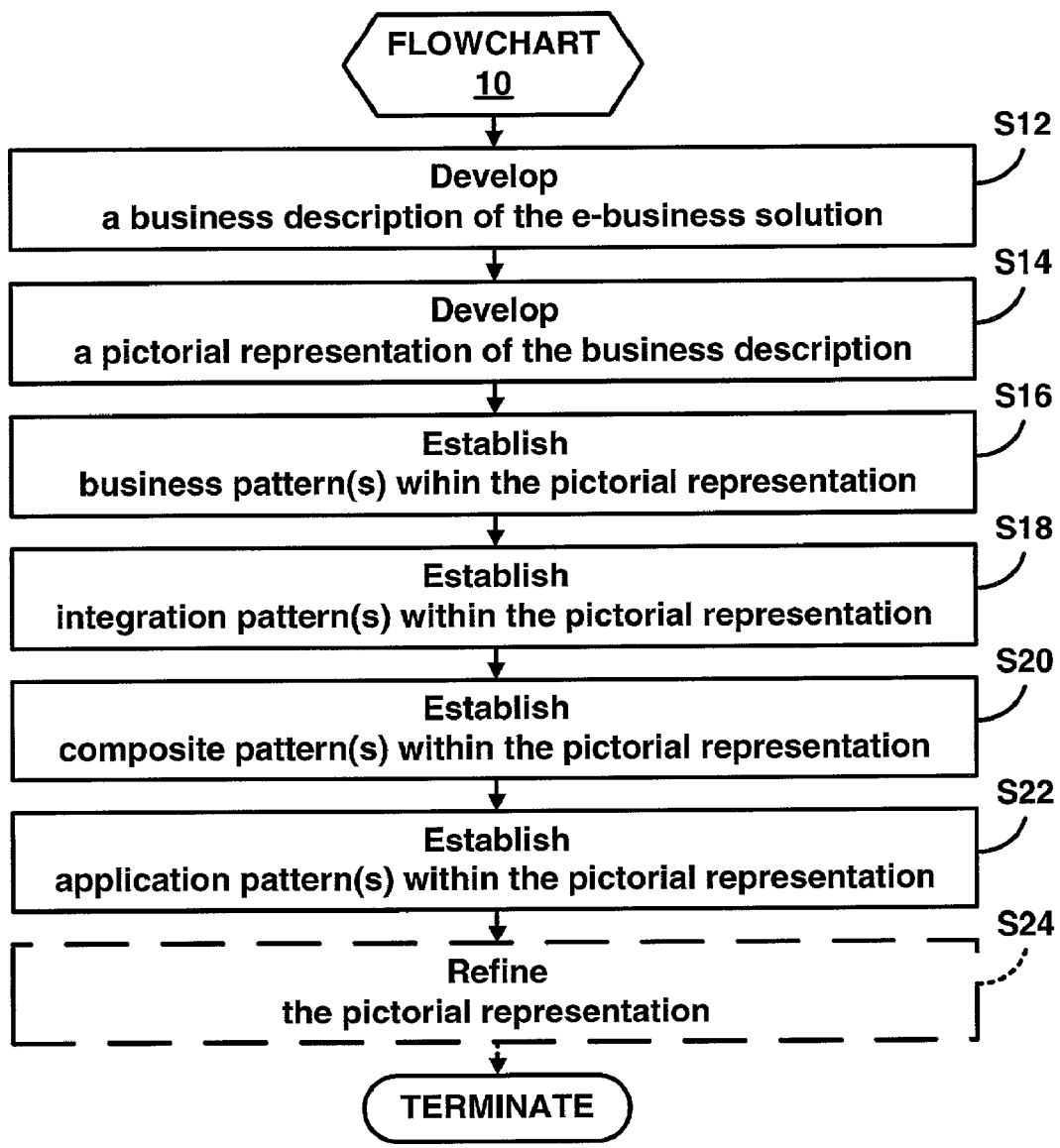
FIG. 1 is a flow chart representation of a preferred embodiment of a method of designing an architecture of an e-business solution in accordance with the present invention.

In FIG. 1, a method for designing architecture of an e-business solution is illustrated in accordance with method of the present invention in the form of a flowchart 10. As shown in FIG. 1, a business description of the e-business solution is developed during a stage S12 of flowchart 10. In one embodiment of flowchart 10, the business description is a textual description of each actor (e.g., buyers, sellers, networks, systems, devices, external institutions, etc.) who will participate in the e-business solution as well as the interactions among the actors that explain the core business functions of the e-business solution (e.g., marketplace administration, consumer news, aggregated catalog, search & selection, auction, order management, and authorization workflows). Those having ordinary skill in the art will appreciate the development of a business description in the form of a textual description.

Figure 2A:
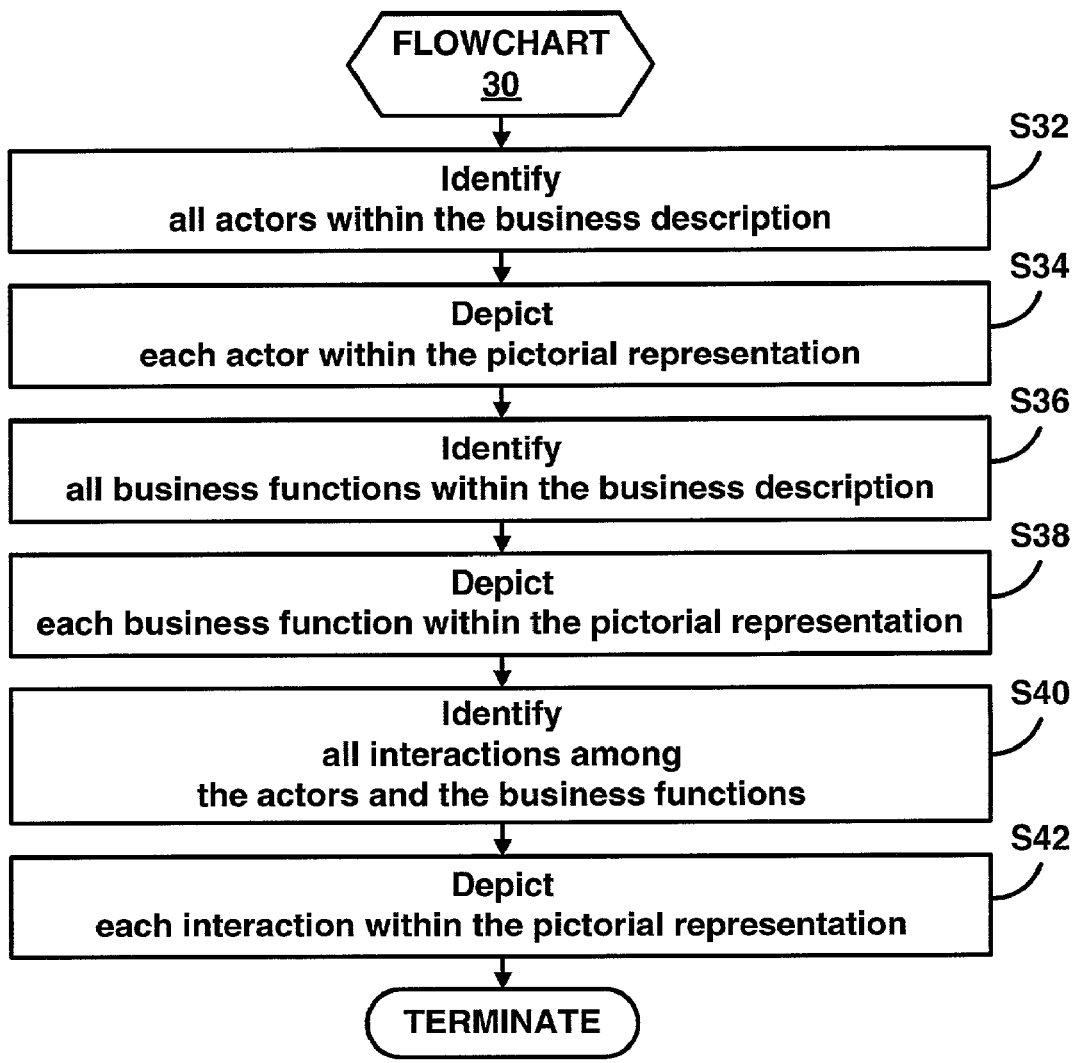
FIG. 2A is a flow chart representation of a method of developing a pictorial representation of the business description in accordance with the present invention.
Figure 2B:
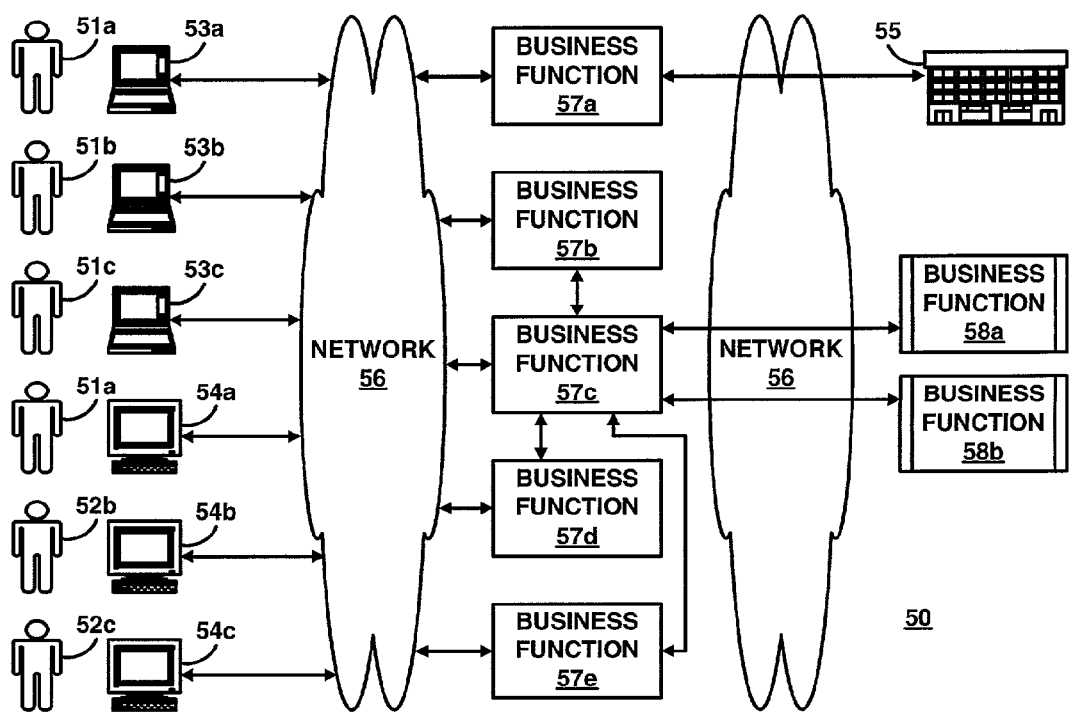
FIG. 2B is an illustration of an exemplary Solution Overview Diagram.

As shown in FIG. 1, a pictorial representation (e.g., a Solution Overview Diagram ("SOD")) of the business description developed during stage S12 is developed during a stage S14 of flowchart 10. In one embodiment of stage S14, a flowchart 30 illustrated in FIG. 2A is implemented during stage S14. As shown in FIG. 2A, all actors within the business description are identified during a stage S32 of flowchart 30. Each actor identified during stage S32 is depicted in the pictorial representation during a stage S34 of flowchart 30. An exemplary SOD 50 is shown in FIG. 2B. As shown in FIG. 2B, SOD 50 includes actors in the form of buyers 51a-51c, sellers 52a-52c, personal computers 53a-53c, workstations 54a-54c, an information source 55, and a network 56 (e.g., the Internet).

Referring again to FIG. 2A, all business functions within the business description are identified during a stage S36 of flowchart 30. Each business function identified during stage S36 is depicted in the pictorial representation during a stage S38 of flowchart 30. As shown in FIG. 2B, SOD 50 includes a business function 57a (e.g., consumer news), a business function 57b (e.g., auction), a business function 57c (e.g., order management), a business function 57b (e.g., marketplace administration), a business function 57b (e.g., authorization workflow), a business function 58a (e.g., order processing system), and a business function 58b (e.g., purchasing processing system). Business functions 57a-57e are depicted as a rectangle to represent business functions to be implemented by newly developed processes or pre-defined processes (e.g., external applications and packages) that will be modified for purposes of achieving the business function. Business functions 58a and 58b are depicted as a rectangle with vertical lines therein to represent business functions to be implemented by pre-defined processes that will achieve a corresponding business function without any modifications thereto.

Referring again to FIG. 2A, all interactions among the actors and the business functions are identified during a stage S40 of flowchart 30. Each interaction identified during stage S42 is depicted in the pictorial representation during a stage S42 of flowchart 30. As shown in FIG. 2B, SOD 50 includes interactions among buyers 51a-51c and sellers 52a-52c with network 56 via personal computers 53a-53c and workstations 54a-54c, respectively, as depicted by arrows in FIG. 2B. SOD 50 further includes interactions among business functions 57a-57e and network 56 as depicted by arrows in FIG. 2B. Also depicted by arrows in FIG. 2B are an interaction among information source 55 and business function 57a via network 56, an interaction among business functions 57c and 58a via network 56, and an interaction among business functions 57c and 58b via network 56.

Referring again to FIG. 2A, flowchart 30 is terminated upon completion of stage S42. While flowchart 30 illustrated in FIG. 2A has been described herein as a sequential execution of stages S32-S42, the order of execution of stages S32-S42 can involve a non-sequential execution of stages S32-S42 as well as an overlapping execution of stages S32-S42.

Referring again to FIG. 1, flowchart 10 proceeds to stage S16 upon completion of stage S14 with the termination of flowchart 30 or an alternative embodiment of stage S14. One or more business patterns are established (i.e., depicted, listed, or symbolized) within the pictorial representation during stage S16 of flowchart 10. A business pattern is a grouping of one or more actors and one or more business functions based on a nature of the interaction among the actor(s) and the business function(s). Those having ordinary skill in the art will appreciate the various types of business patterns applicable to flowchart 10.

In one embodiment of flowchart 10, there are four types of business patterns. A first type of business pattern is a self-service business pattern that groups one or more actors and/or one or more business functions for capturing the essence of direction interactions among the actor(s) and the business function(s). A second type of business pattern is a collaboration business pattern that groups one or more actors and/or one or more business functions for addressing any collaboration among the actors. A third type of business pattern is an information aggregation business pattern that groups one or more actors and/or one or more business functions for allowing the actors to access and manipulate data that is aggregated from one or more information sources. A fourth type of business pattern is an extended enterprise business pattern that groups one or more actors and/or one or more business functions for addressing the interactions and collaborations among business processes in separate enterprises.

Figure 3A:
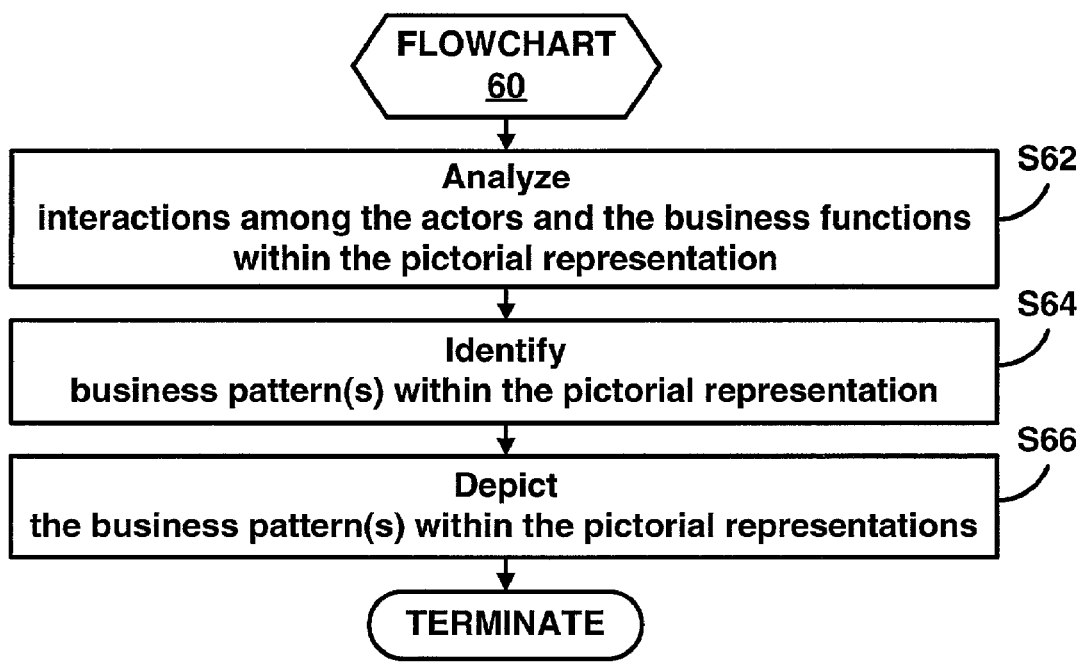
FIG. 3A is a flow chart representation of a method of establishing business pattern(s) within a pictorial representation in accordance with the present invention.
Figure 3B:
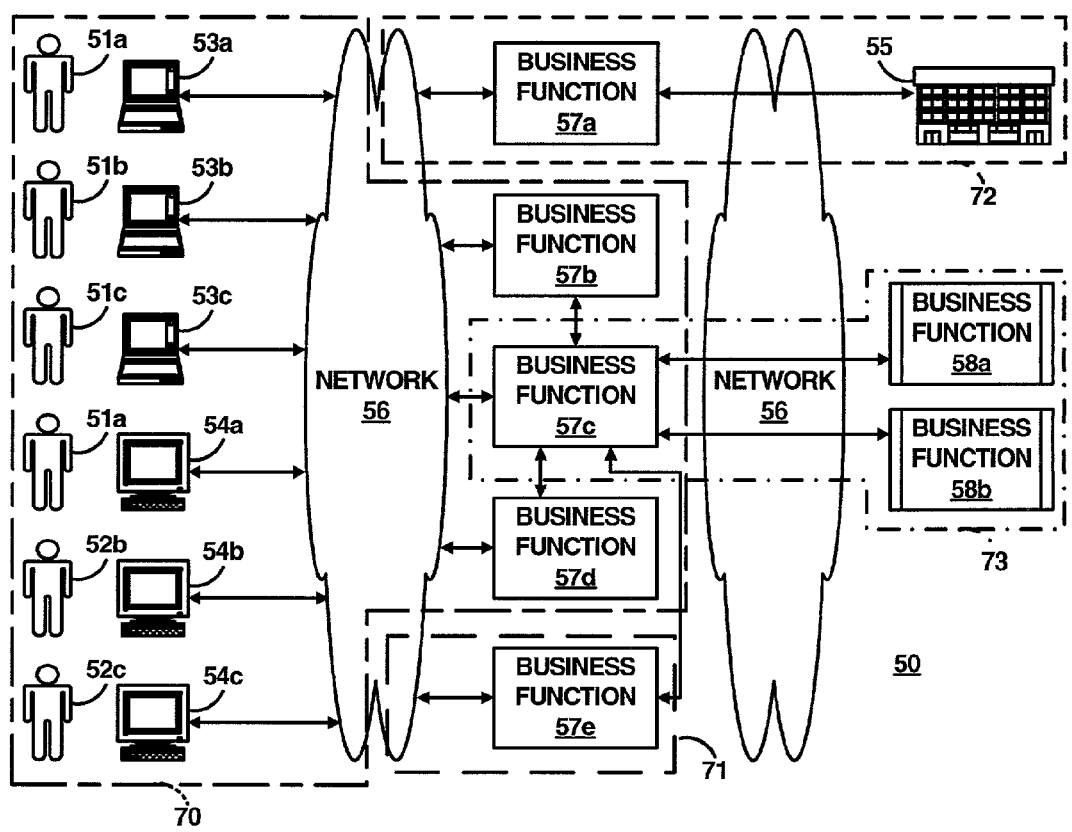
FIG. 3B is an illustration of exemplary business patterns depicted on the Solution Overview Diagram of FIG. 2B.

In one embodiment of stage S16, a flowchart 60 illustrated in FIG. 3A is implemented during stage S16. As shown in FIG. 3A, the interactions among the actors and the business functions within the pictorial representation are analyzed during a stage S62 of flowchart 60 in the context of the aforementioned four (4) types of business patterns. The analysis of the interactions facilitates an identification of one or more of the four (4) types of business patterns within the pictorial representation during a stage S64 of flowchart 60. Each type of business pattern identified during stage S64 is depicted in the pictorial representation during a stage S66 of flowchart 60. As shown in FIG. 3B, SOD 50 illustrates an exemplary analysis, identification, and depiction of a self-service business pattern 70 with a grouping of buyers 51a-51c, sellers 52a-52c, personal computers 53a-53c, workstations 54a-54c, network 56, business function 57b (e.g., auction), business function 57c (e.g., order management), and business function 57d (e.g., marketplace administration). SOD 50 further illustrates an exemplary analysis, identification, and depiction of a collaborative business pattern 71 with a grouping of network 56 and business function 57e (e.g., authorization workflow). SOD 50 further illustrates an exemplary analysis, identification, and depiction of an information aggregation business pattern 72 with a grouping of information source 55, network 56 and business function 57a (e.g., consumer news). SOD 50 further illustrates an exemplary analysis, identification, and depiction of an extended enterprise business pattern 73 with a grouping of network 56, business function 57c (e.g., order management), business function 58a (e.g., order processing system), and business function 58b (e.g., purchasing processing system).

Referring again to FIG. 3A, flowchart 60 is terminated upon completion of stage S66. While flowchart 60 has been described herein as a sequential execution of stages S62-S66, the order of execution of stages S62-S66 can involve a non-sequential execution of stages S62-S66 as well as an overlapping execution of stages S62-S66.

Referring again to FIG. 1, flowchart 10 proceeds to stage S18 upon completion of stage S16 with the termination of flowchart 60 or an alternative embodiment of stage S16. One or more integration patterns are established (i.e., depicted, listed or symbolized) within the pictorial representation during stage S18 of flowchart 10. An integration pattern is an integration of two or more business patterns. Those having ordinary skill in the art will appreciate various types of integration patterns applicable to flowchart 10.

In one embodiment of flowchart 10, there are two types of integration pattern. A first type of integration pattern is an application integration pattern that integrates web-based solutions to core business systems and databases. The application integration pattern requires the seemless execution of multiple applications and access to their respective data to thereby automate an e-business solution. A second type of integration pattern is an access integration pattern that describes a recurring design(s) that enable access to one or more business patterns. Specifically, an access integration pattern enables access from multiple channels (devices) and integrates the commons services required to support a consistent user interface.

Figure 4A:
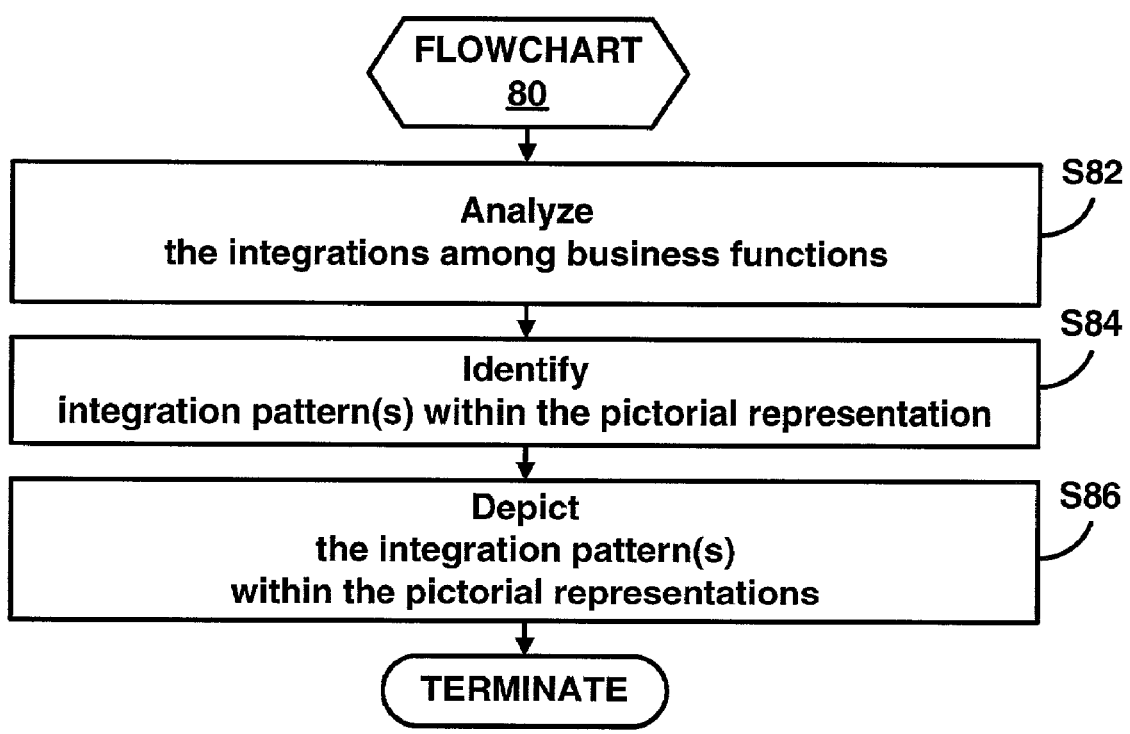
FIG. 4A is a flow chart representation of a method of establishing integration pattern(s) within a pictorial representation in accordance with the present invention.
Figure 4B:
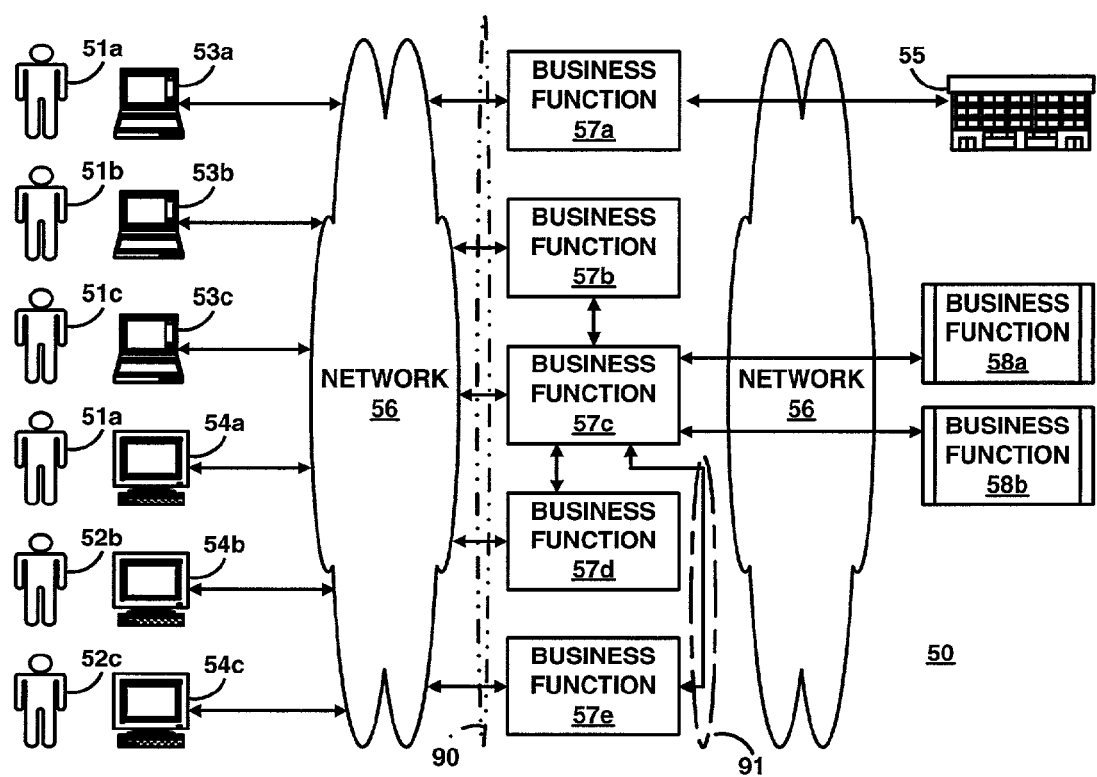
FIG. 4B is an illustration of exemplary integration patterns depicted on the Solution Overview Diagram of FIG. 2B.

In one embodiment of stage S18, a flowchart 80 illustrated in FIG. 4A is implemented during stage S18. As shown in FIG. 4A, the integration among the business functions within the pictorial representation are analyzed during a stage S82 of flowchart 80 in the context of the aforementioned two (2) types of integration patterns. The analysis of the integrations facilitates an identification of one or more of the two (2) types of integration patterns within the pictorial representation during a stage S84 of flowchart 80. Each type of integration pattern identified during stage S84 is depicted in the pictorial representation during a stage S86 of flowchart 80. As shown in FIG. 4B, SOD 50 illustrates an exemplary analysis, identification, and depiction of access integration pattern 90 describing a recurring access among self-service business pattern 70 (FIG. 3B), collaboration business pattern 71 (FIG. 3B), and information aggregation business pattern 72 (FIG. 3B). SOD 50 further illustrates an exemplary analysis, identification, and depiction of an application business pattern 92 as shown in FIG. 3B of an integration among business function 57c (e.g., order management), and business function 57e (e.g., authorization overflow).

An application integration pattern for business functions 57b-57d within self-service business pattern 70 (FIG. 3B) is not analyzed, identified or depicted in SOD 50 as shown in FIG. 4B, because of an assumption of one application within self-service business pattern 70 that enables communication among for business functions 57b-57d. Also, an application integration pattern of an integration of self-service business pattern 70 and extended enterprise business pattern 73 (FIG. 3B) is not analyzed, identified or depicted in SOD 50 as shown in FIG. 4B, because of an assumption of one application that enables communication among self-service business pattern 70 and extended enterprise business pattern 73 via business function 57c (e.g., order management) which is common to self-service business pattern 70 and extended enterprise business pattern 73. However, these aforementioned application integration patterns can be analyzed, identified and depicted in SOD 50.

Referring again to FIG. 4A, flowchart 80 is terminated upon completion of stage S86. While flowchart 80 has been described herein as a sequential execution of stages S82-S86, the order of execution of stages S82-S86 can involve a non-sequential execution of stages S82-S86 as well as an overlapping execution of stages S82-S86.

Referring again to FIG. 1, flowchart 10 proceeds to stage S20 upon completion of stage S18 with the termination of flowchart 80 or an alternative embodiment of the invention. One or more composite patterns are established (i.e., depicted, listed or symbolized) within the pictorial representation during stage S20 of flowchart 10. A composite pattern is a grouping of a recurring combination of business pattern(s) and integration pattern(s) established within the pictorial representation. In one embodiment of stage S20, a flowchart 100 illustrated in FIG. 5A is implemented during stage S20.

Figure 5A:
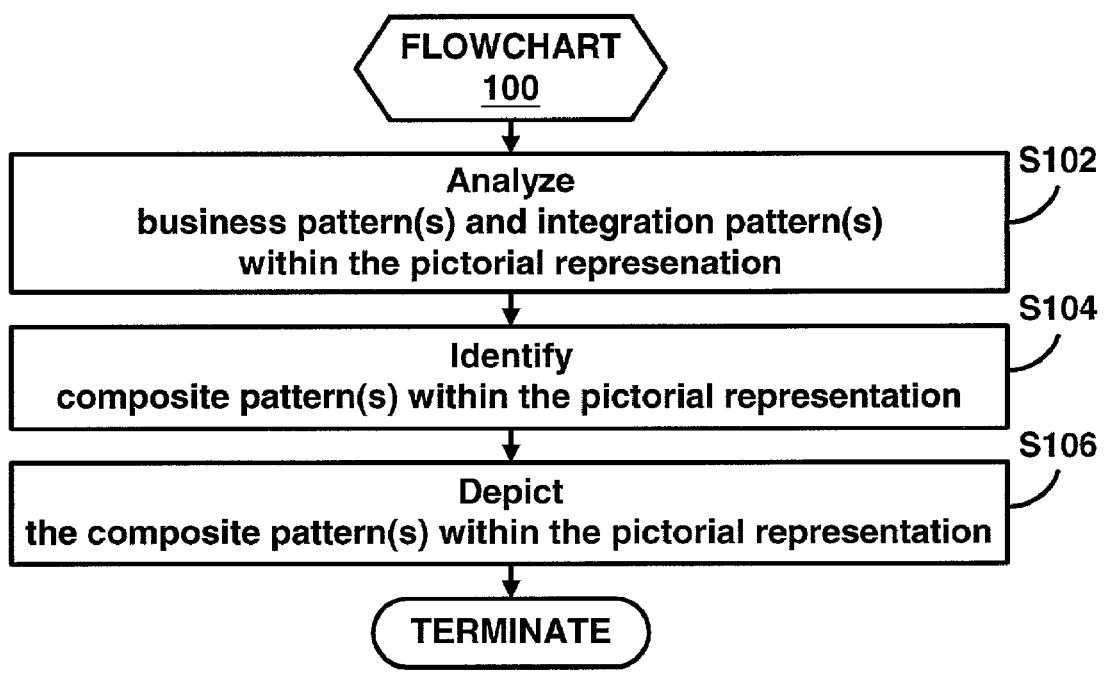
FIG. 5A is a flow chart representation of a method of establishing composite pattern(s) within a pictorial representation in accordance with the present invention.
Figure 5B:
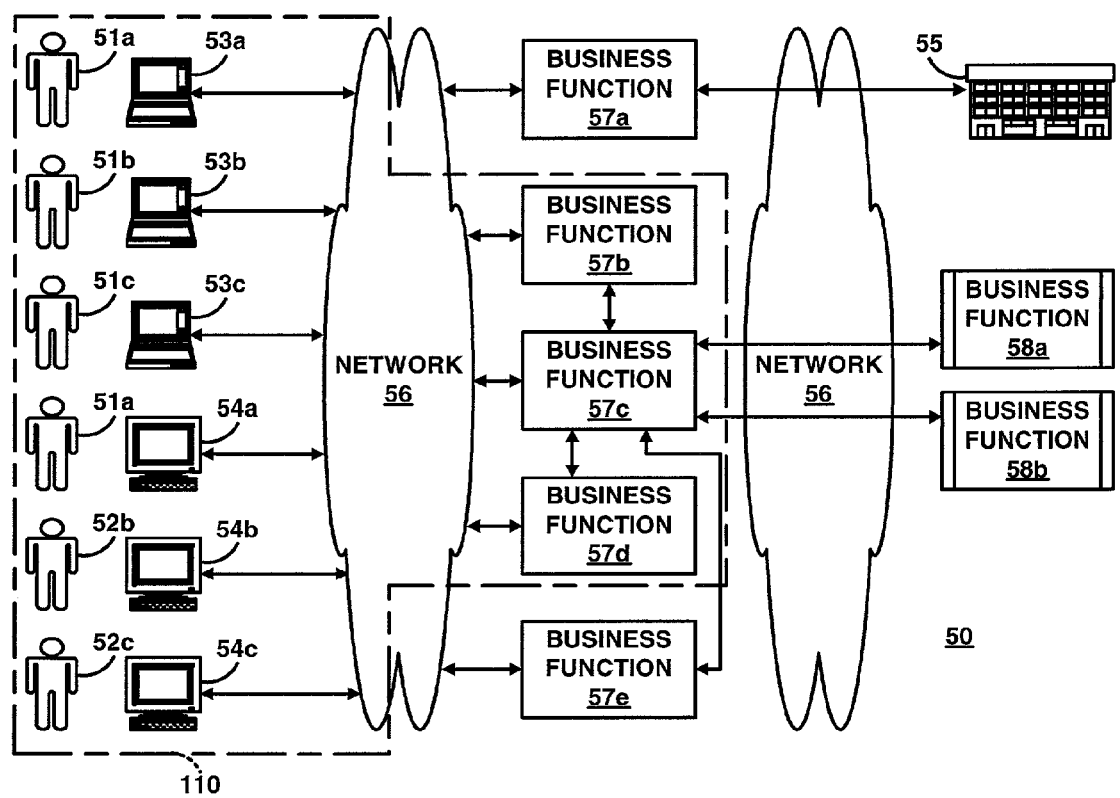
FIG. 5B is an illustration of an exemplary composite pattern depicted on the Solution Overview Diagram of FIG. 2B.

As shown in FIG. 5A, the business pattern(s) and the integration pattern(s) established within the pictorial representation during stage S16 and S18, respectively, of flowchart 10 are analyzed during a stage S102 of flowchart 100. The analysis of the business pattern(s) and the integration pattern(s) facilitates an identification of one or more of composite patterns within the pictorial representation during a stage S104 of flowchart 100. Each composite pattern identified during stage S104 is depicted in the pictorial representation during a stage S106 of flowchart 100. As shown in FIG. 5B, SOD 50 illustrates an exemplary analysis, identification, and depiction of a composite pattern 110 describing a recurring combination of self-service business pattern 70 (FIG. 3B) and access integration pattern 90 (FIG. 4B). Please note that business patterns and integration patterns established within a pictorial representation during stages S16 and S18 of flowchart 10, respectively, are typically concurrently depicted within the pictorial representation to facilitate an establishment of composite pattern(s) during stage S20. However, business patterns 70-73 and integration patterns 90 and 91 were not currently shown on SOD 50 in FIG. 3B and FIG. 4B, respectively, to facilitate a straightforward description of stages S16 and S18, respectively.

Referring again to FIG. 5A, flowchart 100 is terminated upon completion of stage S106. While flowchart 100 has been described herein as a sequential execution of stages S102-S106, the order of execution of stages S102-S106 can involve a non-sequential execution of stages S102-S106 as well as an overlapping execution of stages S102-S106.

Referring again to FIG. 5A, flowchart 10 proceeds to stage S22 as shown in FIG. 1 upon completion of stage S20 with the termination of flowchart 100 or alternative embodiment of stage S20. One or more application patterns are established (i.e., depicted, listed or symbolized) within the pictorial representation during stage S22 of flowchart 10. An application pattern is a representation of the partitioning of the application logic and data with the styles of interaction among the logical tiers that facilitates an automation of the architecture. As such, two or more application patterns can be associated within any given business pattern or integration pattern. Those having ordinary skill in the art will appreciate various types of application patterns applicable to flowchart 10.

In one embodiment of flowchart 10, there are three (3) types of application patterns. A first type of application pattern is a router application pattern associated with the self-service business pattern that provides a structure for application programs that require the intelligent routing of requests from multiple delivery channels to one of multiple backend applications. A second type of application pattern is a decomp application pattern associated with the self-service business pattern that decomposes a single, compound request from a client into several, simpler requests and intelligently routes them to multiple backend application programs. Additionally, responses from the clients are recomposed into a single response and sent back to the client. A third type of application pattern is a pervasive device access application pattern associated with the access integration pattern that provides a structure for extending the reach of individual application programs from browsers and fat clients to pervasive devices such as Personal Data Assistants and mobile phones.

Figure 6A:
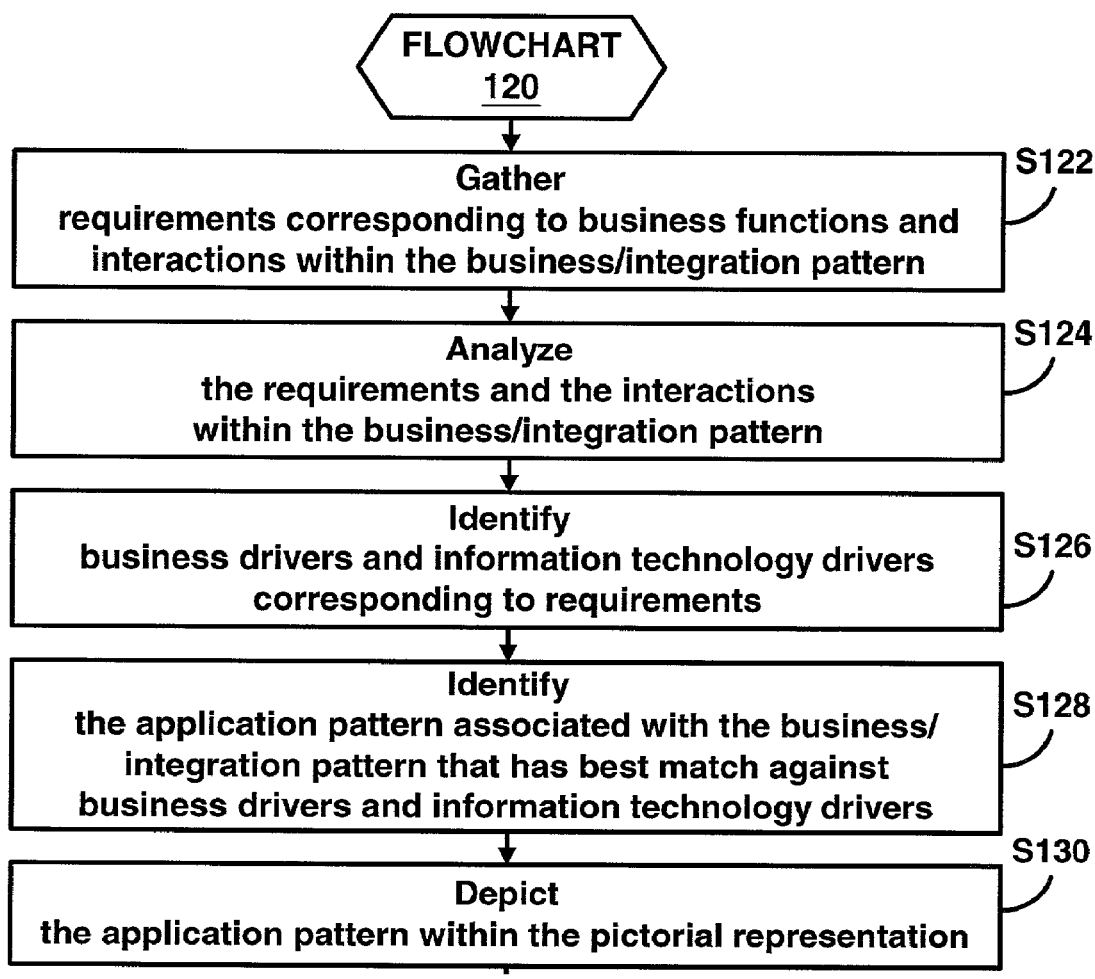
FIG. 6A is a flow chart representation of a method of establishing application pattern(s) within a pictorial representation in accordance with the present invention.

In one embodiment of stage S22, a flowchart 120 illustrated in FIG. 6A is implemented during stage S22 for each business pattern (e.g., business patterns 70-73 shown in FIG. 3B) and integration pattern (e.g., integration patterns 90 and 91 shown in FIG. 4B) established within the pictorial representation during stage S16 and stage S18, respectively, of flowchart 10. As shown in FIG. 6A, business requirements corresponding to the business functions and interactions within a selected business pattern or integration pattern are gathered during a stage S122 of flowchart 120. The business requirements gathered during stage S122 are analyzed in conjunction with the interactions within the selected business pattern or integration pattern during a stage S124 of flowchart 120. The analysis performed during stage S124 facilitates an identification of business drivers and information technology drivers corresponding to the requirements during a stage S126 of flowchart 120. The following TABLE 1 illustrates an exemplary listing of business drivers and information technology drivers employed during stage S126:

TABLE 1

| BUSINESS DRIVERS | INFORMATION TECHNOLOGY DRIVERS |
|---|---|
| Time to market | Minimize application complexity |
| Improve the organizational efficiency | Minimize total cost of ownership |
| Reduce the latency of business assets | Leverage existing skills |
| Easy to adapt during mergers & acquisitions | Leverage legacy investment |
| Integration across multiple delivery channels | Backend application integration |
| Unified customer view across lines of businesses | Minimize enterprise complexity |
| Support effective cross selling | Maintainability |
| Mass customization | Scalablity |

The selected business/integration pattern will be associated with one or more application patterns. When the selected business/integration pattern is associated with only one application pattern, that particular application pattern is identified during a stage S128 of flowchart 120 as the application pattern having the best match with the business drivers and the information technology drivers identified during stage S126. In one embodiment of stage S128, the pervasive device access application pattern is the only application pattern associated with access integration pattern 90 (FIG. 4B) and is therefore identified during stage S128 as the best match of the business drivers and information technology drivers identified during stage S126.

When the selected business/integration pattern is associated with two or more application patterns, each application pattern is matched against the business drivers and the information technology drivers identified during stage S126 to thereby facilitate an identification of the application pattern having the best match with the business drivers and the information technology drivers during stage S128. In one embodiment of stage S128, a route application pattern and a decomp application pattern are associated with the self-service business pattern 70 (FIG. 3B). The following TABLE 2 is an exemplary listing of business drivers and information technology drivers from TABLE 1 corresponding to the router application pattern as associated with self-service business pattern 70:

TABLE 2

| DRIVERS | DRIVER TYPE |
|---|---|
| Reduce the latency of business assets | Business |
| Easy to adapt during mergers & acquisitions | Business |
| Integration across multiple delivery channels | Business |
| Minimize total cost of ownership | Information Technology |
| Leverage existing skills | Information Technology |
| Leverage legacy investment | Information Technology |
| Backend application integration | Information Technology |
| Minimize enterprise complexity | Information Technology |
| Maintainability | Information Technology |
| Scalablity | Information Technology |

The following TABLE 3 is an exemplary listing of business drivers and information technology drivers from TABLE 1 to the decomp application pattern as associated with self-service business pattern 70:

TABLE 3

| DRIVERS | DRIVER TYPE |
|---|---|
| Improve the organization efficiency | Business |
| Reduce the latency of business assets | Business |
| Easy to adapt during mergers & acquisitions | Business |
| Integration across multiple delivery channels | Business |
| Unified customer view across lines of businesses | Business |
| Minimize total cost of ownership | Information Technology |
| Leverage existing skills | Information Technology |
| Leverage legacy investment | Information Technology |
| Backend application integration | Information Technology |
| Minimize enterprise complexity | Information Technology |
| Maintainability | Information Technology |
| Scalablity | Information Technology |

Figure 6B:
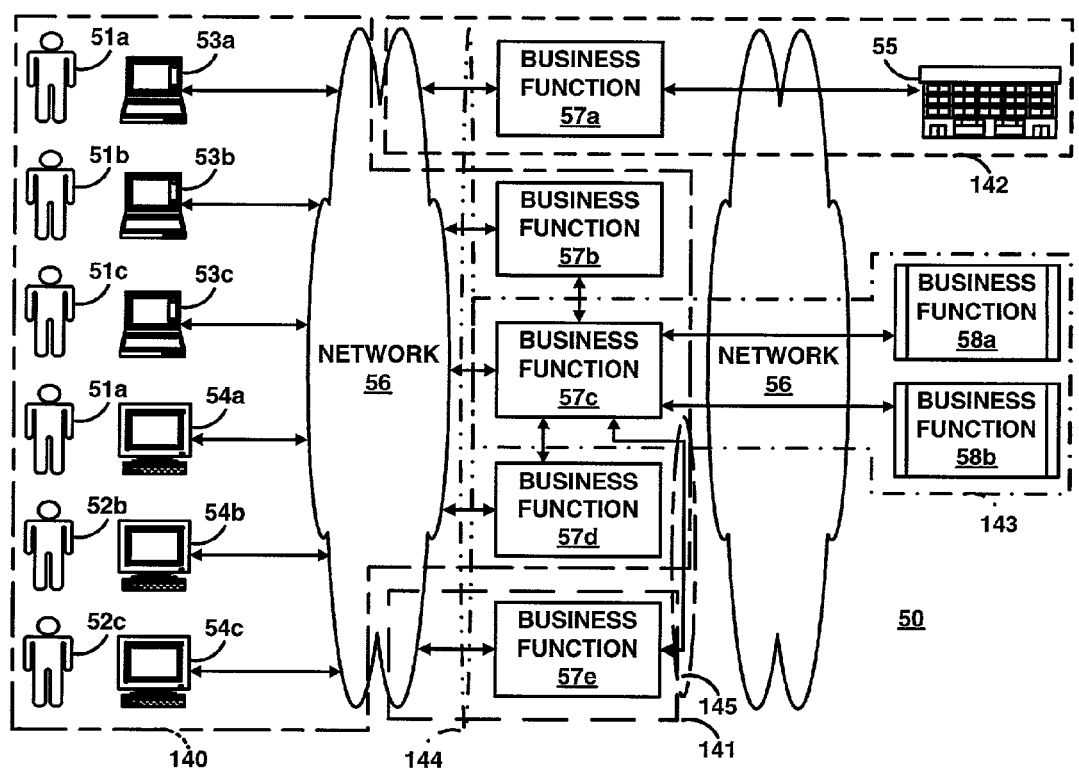
FIG. 6B is an illustration of exemplary application patterns depicted on the Solution Overview Diagram of FIG. 2B.

Accordingly, if number of business drivers and information technology drivers identified during stage S126 listed in TABLE 2 exceeds the number of business drivers and information technology drivers listed in TABLE 3, then the router application pattern as associated with self-service business pattern 70 would be identified as the application pattern having the best match during stage S128. Otherwise, the decomp application pattern as associated with self-service business pattern 70 would be identified as the application pattern having the best match during stage S128. The actual application pattern identified during stage S128 is depicted within the pictorial representation during stage S130 of flowchart 120. As shown in FIG. 6B, SOD 50 exemplary illustrates a representation of a router application pattern 140 as associated with self-service business pattern 70 (FIG. 3B). SOD 50 also exemplary illustrates an application pattern 141 associated with collaboration business pattern 71 (FIG. 3B); an application pattern 142 associated with information aggregation business pattern 72 (FIG. 3G); an application pattern 143 associated with extended enterprise business pattern 73 (FIG. 3G); an application pattern 144 associated with access integration pattern 90 (FIG. 4B); and an application pattern 145 associated with application integration pattern 91 (FIG. 4B).

Referring again to FIG. 6A, flowchart 120 is terminated upon completion of stage S130. While flowchart 120 illustrated in FIG. 6A has been described herein as a sequential execution of stages S122-S130, the order of execution of stages S122-S130 can involve a non-sequential execution of stages S122-S130 as well as an overlapping execution of stages S122-S130.

Referring again to FIG. 1, those having ordinary skill in the art will appreciate that the execution of stages S16-S22 results in a pictorial representation serving as a documentation of a custom designed architecture for an e-business solution. The benefits of stages S16-S22 is a reduction in a risk of an unsuccessful approach in designing the architecture and a decrease in the time needed to design the architecture from scratch.

Flowchart 10 proceeds to an optional stage S24 upon completion of stage S22 with the termination of flowchart 120 or alternative embodiment of stage S22. The pictorial representation resulting from stages S16-S22 can be refined during stage S24. In one embodiment of stage S24, one or more runtime patterns associated with the application patterns identified during stage S22 are utilized to refine the pictorial representation. Runtime patterns are define the logical middleware structure that underpins an application pattern. Thus, runtime patterns depict the major middleware nodes, their roles, and the interfaces among these nodes. Runtime patterns also address how the processing logic and the data are placed on these nodes. Those having ordinary skill in the art will appreciate various types of runtime patterns applicable to the present invention.

Flowchart 10 is terminated upon completion of stage S24 if included therein. While flowchart 10 illustrated has been described herein as a sequential execution of stages S12-S24, the order of execution of stages S12-S24 can involve a non-sequential execution of stages S12-S24 as well as an overlapping execution of stages S12-S24.

Figure 7A:
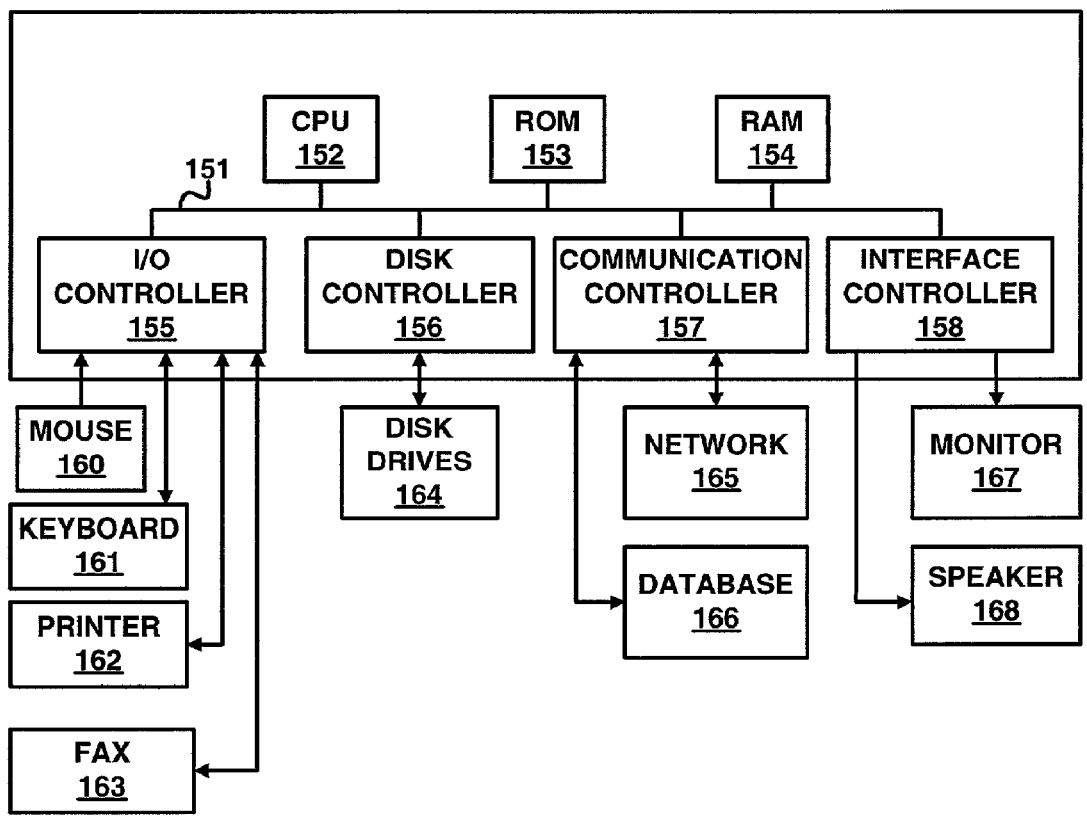
FIG. 7A is a block diagram of a preferred embodiment of computer hardware in accordance with the present invention for performing the method of FIG. 1.
Figure 7B:
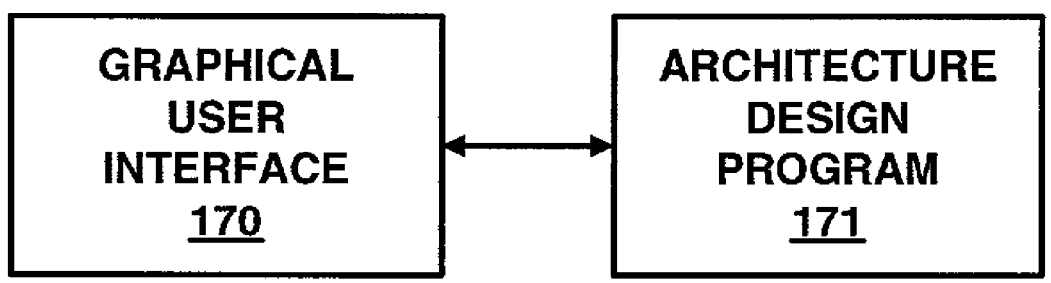
FIG. 7B is a block diagram of a preferred embodiment of computer software in accordance with the present invention for performing the method of FIG. 1.

In FIGS. 7A and 7B, computer hardware and computer software for implementing the method of the present invention as represented by flowchart 10 (FIG. 1) are illustrated, respectively, in accordance with the present invention. As shown in FIG. 7A, the computer hardware includes a bus 151 for facilitating electrical communication among a central processing unit (CPU) 152, a read-only memory (ROM) 153, a random access memory (RAM) 154, an input/output (I/O) controller 155, a disk controller 156, a communication controller 157, and a user interface controller 158. CPU 152 is preferably one of the Intel families of microprocessors, one of the Motorola families of microprocessors, or one of the various versions of a Reduced Instruction Set Computer microprocessor such as the PowerPC chip manufactured by IBM. ROM 153 permanently stores a conventional operating system and various controlling programs such as the Basic Input-Output System (BIOS) developed by IBM. RAM 154 is the memory for loading the operating system and selectively loading the controlling programs as well as the program represented by the computer software shown in FIG. 7B.

Controller 155 is an aggregate of controllers for facilitating an interaction among CPU 152 and pointing devices such as a mouse 160 and a keyboard 161, and among CPU 152 and output devices such as a printer 162 and a fax 163. Controller 156 is an aggregate of controllers for facilitating an interaction among CPU 152 and storage devices such as disks drives 164 in the form of a hard drive, a floppy drive, a local drive, and a compact-disc drive. Controller 157 is a controller for facilitating an interaction among CPU 152 and a network 165, and an interaction among CPU 152 and a database 166 containing records related the business patterns, integration patterns, composite patterns, application patterns, business drivers, information technology drivers, and runtime patterns as would occur to those having ordinary skill in the art. Controller 158 is an aggregate of controllers for facilitating an interaction among CPU 152 and a graphic display device such as a monitor 167, and among CPU 152 and an audio device such as a speaker 168.

Those having skill in the art will appreciate alternative embodiments of the computer hardware shown in FIG. 7A for implementing the principles of the present invention.

As shown in FIG. 7B, the computer software are a conventional graphical user interface 170 for interfacing with a user of the computer hardware (FIG. 7A), and an architecture design program 171 for implementing flowchart 10 (FIG. 1). From the preceding description of flowchart 10, those having ordinary skill in the art will appreciate the various techniques for developing architecture design program 171 (e.g., object-oriented programming) as well as an interaction between graphical user interface 170 and architecture design program 171. Alternatively, architecture design program 171 can be partially or fully implemented by analog circuitry, digital circuitry, or both as appreciated by those having ordinary skill in the art.

Figure 8:
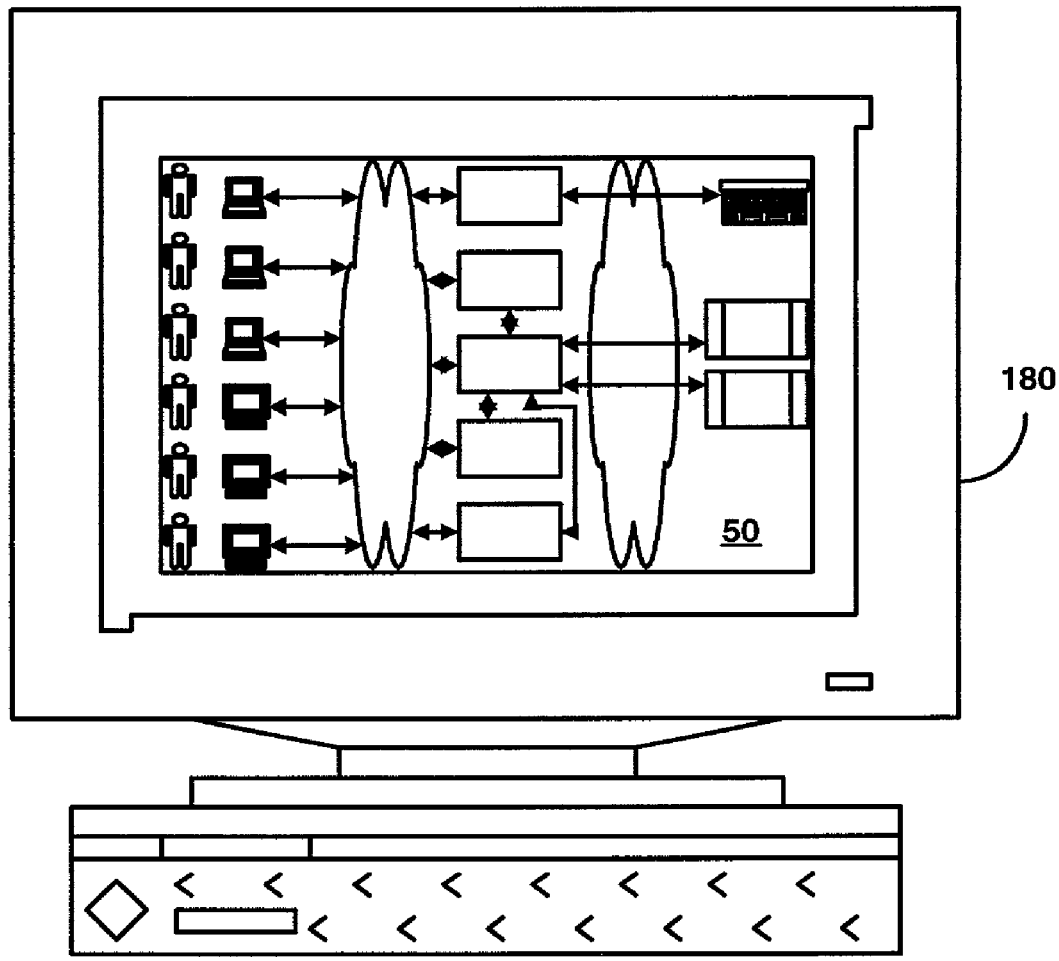
FIG. 8 is illustration of an exemplary display of the Solution Overview Diagram of FIG. 2B on a monitor of the computer hardware of FIG. 7A.

In one embodiment, as shown in FIG. 8, a workstation 180 is assembled in accordance with the computer hardware and the computer software of FIGS. 7A and 7B, respectively. The computer software is physically stored within a computer readable medium of workstation 180 that is electrically, mechanically, and/or chemically altered to carry a computer program product corresponding to flowchart 10 (e.g., the hard disk of the hard disk drive, a CD-ROM disk inserted with the CD-ROM drive, and/or a floppy diskette inserted the floppy disk). Consequently, workstation 180 is operable to develop and display a pictorial representation such as SOD 50 whereby a user of workstation 180 obtains the benefits of flowchart 10.

Figure 9:
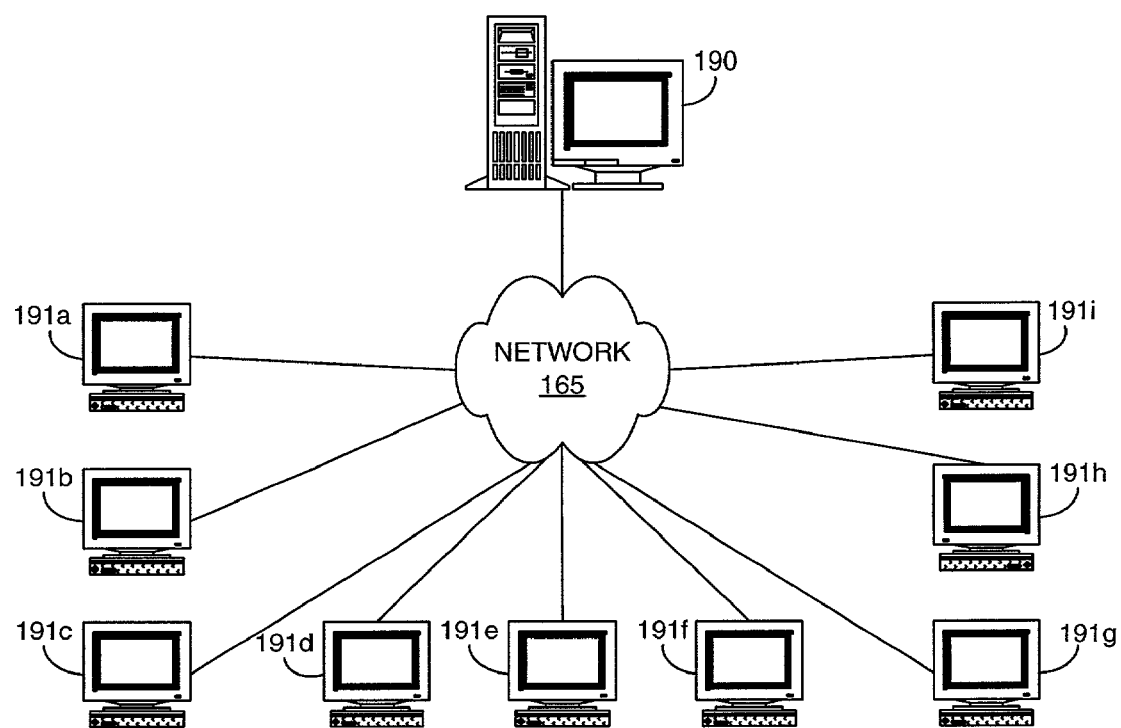
FIG. 9 is a block diagram of a preferred embodiment of computer network in accordance with the present invention for performing the method of FIG. 1.

In another embodiment, as shown in FIG. 9, a server 191 is assembled in accordance with the computer hardware and architectural design program 171 of FIGS. 7A and 7B, respectively. Architecture design program 171 is physically stored within a computer readable medium of server 190 that is electrically, mechanically, and/or chemically altered to carry a computer program product corresponding to flowchart 10 (e.g., the hard disk of the hard disk drive, a CD-ROM disk inserted with the CD-ROM drive, and/or a floppy diskette inserted the floppy disk). Additionally, a plurality of workstations 191a-191i are assembled in accordance with the computer hardware and graphical user interface 170 of FIGS. 7A and 7B, respectively. Server 190 is conventionally operable to transmit a copy of architecture design program 171 to one or more workstations 191a-191i via network 164. As a result, users of workstations 191a-191i can develop and display a pictorial representation such as SOD 50 whereby the users can obtain the benefits of flowchart 10.

The above-described methods and implementation of encoding and decoding media sequences are example methods and implementations. These methods and implementations illustrate one possible approach for encoding and decoding media sequences. The actual implementation may vary from the method discussed. Moreover, various other improvements and modifications to this invention may occur to those skilled in the art, and those improvements and modifications will fall within the scope of this invention as set forth below.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method for designing an architecture for an e-business solution, said method comprising:

developing a business description of the e-business solution, the business description describing each actor and each business function in the e-business solution, the business description further describing each interaction among one or more actors and one or more business functions;

developing a pictorial representation of the business description;

establishing one or more business patterns that are identifiable within the pictorial representation, each business pattern being indicative of each grouping of one or more actors and one or more business functions based on a nature of the interaction among the one or more actors and the one or more business functions;

establishing one or more integration patterns that are identifiable within the pictorial representation, each integration pattern being indicative of an integration of two or more business patterns;

establishing one or more composite patterns that are identifiable within the pictorial representation, each composite pattern being indicative of a grouping of a recurring combination of one or more business patterns and one or more integration patterns; and establishing one or more application patterns that are identifiable within the pictorial representation, each application pattern being indicative of a partitioning of an application logic and a data together with the styles of interaction among a plurality of logical tiers.

2. The method of claim 1 wherein the developing a pictorial representation of the business description includes:

identifying all of the actors within the business description;

depicting each actor in the pictorial representation;

identifying each business function in the business description;

depicting each business function in the pictorial representation;

identifying each interaction among the one or more actors and the one or more business functions; and depicting each interaction in the pictorial representation.

3. The method of claim 1 wherein establishing one or more business patterns that are identifiable within the pictorial representation includes:

identifying each business pattern within the pictorial representation; and depicting each business pattern within the pictorial representation.

4. The method of claim 1 wherein establishing one or more integration patterns that are identifiable within the pictorial representation includes:

identifying each integration pattern within the pictorial representation; and depicting each integration pattern within the pictorial representation.

5. The method of claim 1 wherein establishing one or more composite patterns that are identifiable within the pictorial representation includes:

identifying each composite pattern within the pictorial representation; and depicting each composite pattern within the pictorial representation.

6. The method of claim 1 wherein establishing one or more application patterns that are identifiable within the pictorial representation includes:

gathering one or more business requirements corresponding to each business function and each interaction within a first business pattern of the one or more business patterns;

identifying each business driver corresponding to the one or more business requirements;

identifying each information technology driver corresponding to the one or more business requirements;

identifying an application pattern associated with the first business pattern having a best match to each business driver and each information technology driver; and depicting the application pattern within the pictorial representation.

7. The method of claim 1 wherein establishing one or more application patterns that are identifiable within the pictorial representation includes:

gathering one or more business requirements corresponding to each business function and each interaction within a first integration pattern of the one or more integration patterns;

identifying each business driver corresponding to the one or more business requirements;

identifying each information technology driver corresponding to the one or more business requirements;

identifying an application pattern associated with the first integration pattern having a best match to each business driver and each information technology driver; and depicting the application pattern within the pictorial representation.

8. The method of claim 1 further comprising:

refining the pictorial representation.

9. A system for designing an architecture for an e-business solution, said system comprising:

means for developing a business description of the e-business solution, the business description describing each actor and each business function in the e-business solution, the business description further describing each interaction among one or more actors and one or more business functions;

means for developing a pictorial representation of the business description;

means for establishing one or more business patterns that are identifiable within the pictorial representation, each business pattern being indicative of each grouping of one or more actors and one or more business functions based on a nature of the interaction among the one or more actors and the one or more business functions;

means for establishing one or more integration patterns that are identifiable within the pictorial representation, each integration pattern being indicative of an integration of two or more business patterns;

means for establishing one or more composite patterns that are identifiable within the pictorial representation, each composite pattern being indicative of a grouping of a recurring combination of one or more business patterns and one or more integration patterns; and means for establishing one or more application patterns that are identifiable within the pictorial representation, each application pattern being indicative of a partitioning of an application logic and a data together with the styles of interaction among a plurality of logical tiers.

* * * * *